United States Patent [19]

Nathan

[11] Patent Number: 4,806,006
[45] Date of Patent: Feb. 21, 1989

[54] OPTICAL DEVICE WITH RECEIVING MEANS ADJUSTABLE TO VIEW DIFFERENT PORTIONS OF AN IMAGE

[76] Inventor: William P. Nathan, 20 Brocks Drive, Fairlands, Worplesdon, Guildford, Surrey GU3 3NQ, England

[21] Appl. No.: 50,116
[22] Filed: May 15, 1987
[30] Foreign Application Priority Data
May 16, 1986 [GB] United Kingdom ............. 8612935
[51] Int. Cl.$^4$ ............ G02B 23/00; G02B 23/16; G02B 25/04
[52] U.S. Cl. ............. 350/567; 350/501; 350/537; 350/557; 350/571; 350/247
[58] Field of Search ............. 350/501, 506, 565, 562, 350/567, 537, 500, 247, 571

[56] References Cited
U.S. PATENT DOCUMENTS
3,706,848 12/1972 Rouet .
3,740,121 5/1987 Nathan ................. 350/247
4,155,622 5/1979 Klein .................. 350/518

FOREIGN PATENT DOCUMENTS
0089671 9/1983 European Pat. Off. .
WO80/02069 10/1980 PCT Int'l Appl. .
360306 11/1931 United Kingdom .
536706 5/1941 United Kingdom .
668673 3/1952 United Kingdom .
958253 5/1964 United Kingdom .
1553849 10/1979 United Kingdom .

Primary Examiner—Jon W. Henry
Attorney, Agent, or Firm—Spencer & Frank

[57] ABSTRACT

In a gun sight an objective lens system 4 is designed to produce a larger than normal image and the eye-piece 6 is designed to be adjusted so as to view different parts of the image. This allows the gunner to view features which are significantly off-axis without interfering with the bore-sighting of the gun.

8 Claims, 1 Drawing Sheet

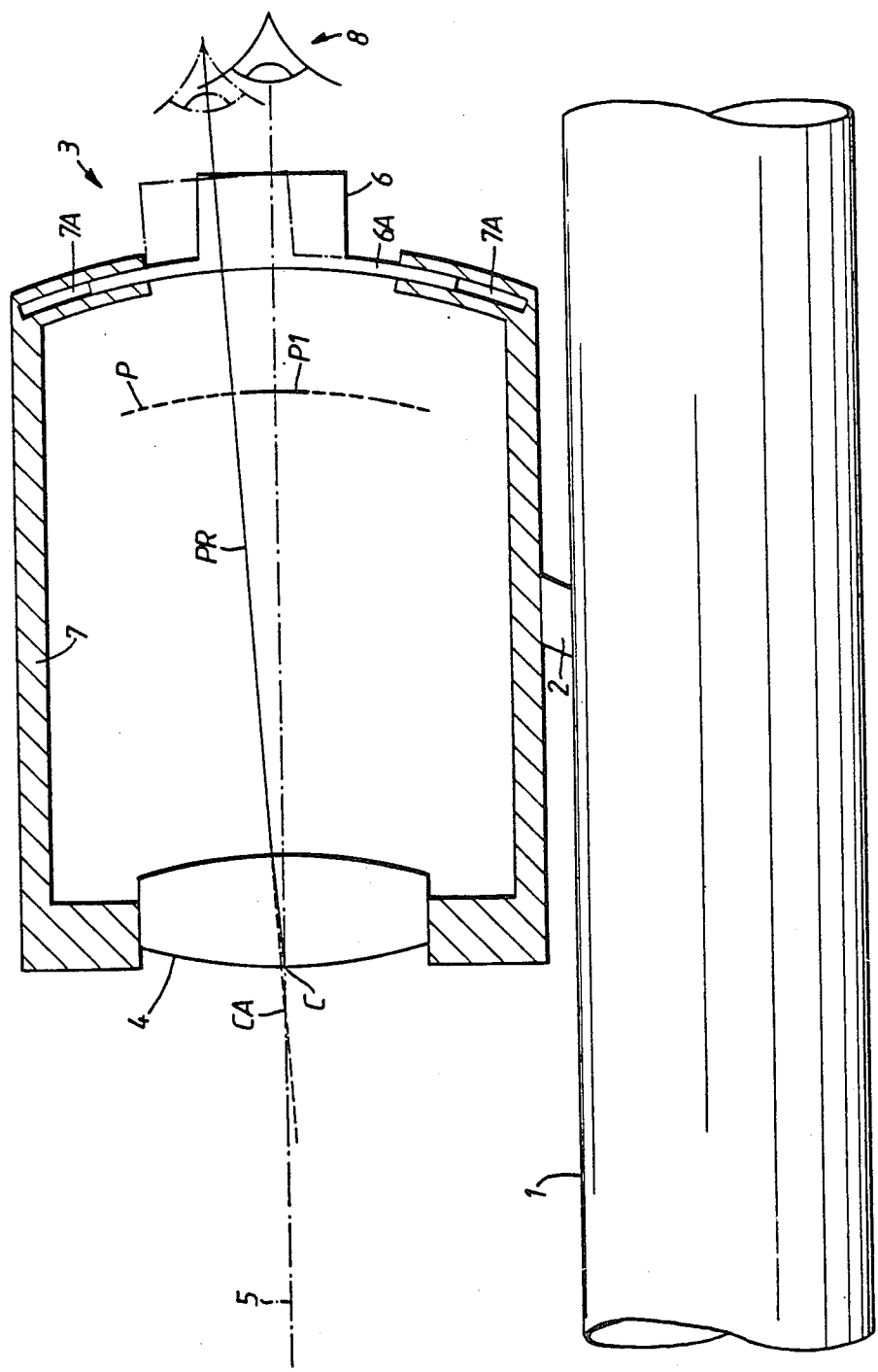

OPTICAL DEVICE WITH RECEIVING MEANS ADJUSTABLE TO VIEW DIFFERENT PORTIONS OF AN IMAGE

BACKGROUND OF THE INVENTION

Field of the Invention

This invention relates to an optical device. It arose in relation to the design of gun sights but could possibly be applicable to other areas of optics. In this specification the terms "optical" and "optics" are to be construed as including visible, infra-red, ultra-violet and any other lens and/or mirror systems.

In operation of a gun sight the gunner sometimes needs to view subjects outside the field of view of the sight and, in order to do so, needs to move the sight so as to change its field of view. This either involves moving the gun, which may be undesirable because such movement can be detected by others; or involves moving the sight relative to the gun. Moving the sight relative to the gun introduces the problem of subsequently needing to re-align the sight with the gun.

SUMMARY OF THE INVENTION

This invention provides an optical device comprising image producing means for producing an image, receiving means for receiving a selected portion of the image, and an adjustment mechanism for adjusting the receiving means so as to select the said portion of the image.

By employing the invention, a gun sight can be built whose objective system (the "observation means") is designed to produce a larger than normal image; i.e. an image of a wider than normal field of view. In such a system the eye-piece is designed to view, at any one time, only a selected portion of the image but can be moved off-axis, to view other selected portions without interfering with the bore-sight of the gun. Furthermore, the gunner is able to adjust the eye-piece so that a feature of particular interest is located at the centre of the "selected portion" allowing it to be viewed with the minimum of aberration.

The objective lens, or other observation means, is preferably designed so that the principal rays are normal to the image surface, thus allowing even focus across the complete field of view of the eye-piece or other observation device. The term "principal ray" is used in this specification in the sense as defined in the book "Modern Optical Engineering" by Warren J. Smith published by McGraw Hill Book Company page 124 i.e. as meaning "the ray through the centre of the aperture stop". The entrance and exit pupils of the system are the images of the aperture stop in object and image space respectively.

The invention is not exclusively applicable to gun sights or to systems using the human eye as a sensor. Instead of the human eye, an optical sensor, e.g. an infra-red detector or array could be employed in which case the eye-piece could be replaced by an analogous optical observation means. There may be other systems in which it is desirable for an infra-red or visual photosensor to view just a part of a larger image and so the invention could find application in environments other than gun sights.

Conventional optical design practices would lead one to believe that by moving the eye-piece or other receiving device off-axis unacceptable aberrations would result. However the inventor has realised that this problem can be overcome by affecting the adjustment in such a way that the optical axis of the receiving device is always colinear with either the optical axis of the observation device or one of its principal rays. It will be understood that, for an optical system such as an eye-piece a change in stop, pupil, position will cause a change in aberrations in the system. By adopting principal rays as axial rays it is possible to move the eye-piece without moving the position of the pupils relative to the eye-piece.

The principle of avoiding unacceptable aberrations by moving one optical system so that its axis remains colinear with the principal rays of another optical system could be useful in other environments. Thus, according to a second aspect of this invention there is provided an optical device comprising first and second optical assemblies, the first optical assembly defining principal rays, and guide means allowing relative movement between the two assemblies in such a way that an optical axis of the second assembly is always co-linear with a principal ray of the first assembly.

BRIEF DESCRIPTION OF THE DRAWINGS

One way in which the invention may be performed will now be described by way of example with reference to the accompanying drawings in which:

the scale figure shows, in very schematic form, a gun fitted with a gun sight constructed in accordance with the invention.

DESCRIPTION OF THE PREFERRED EMBODIMENT

Referring to the scale figure of the drawings there is shown a gun 1 joined by a mechanical or electrical link 2 to a gun sight 3.

The gun sight 3 comprises an objective lens system 4 (forming the "observation means" of the invention). The objective lens system 4 has an optical axis 5 which is bore-sighted to the gun. The characteristics of the optical lens system 4 are as shown by table below.

| SUR NUM | ND | R | ND | T | dN | MATERIAL |
|---|---|---|---|---|---|---|
| 1 | 1 | 165.402307 | 1.5206 | 8.08495018 | 8.59E-3 | HC 519604 |
| NF | 1 | | 1.52496 | | | |
| NC | 1 | | 1.51637 | | | |
| 2 | 1.5206 | −164.700937 | 1 | 1.22499245 | 0 | AIR |
| NF | 1.52496 | | 1 | | | |
| NC | 1.51637 | | 1 | | | |
| 3 | 1 | −150.404756 | 1.62324 | 5.38996679 | 1.705E-2 | DF 620364 |
| NF | 1 | | 1.63208 | | | |
| NC | 1 | | 1.61503 | | | |
| 4 | 1.62324 | −2021.74382 | 1 | 82.7255847 | 0 | AIR |
| NF | 1.63208 | | 1 | | | |
| NC | 1.61503 | | 1 | | | |

-continued

| SUR NUM | ND | R | ND | T | dN | MATERIAL |
|---|---|---|---|---|---|---|
| 5 | 1 | 360.312376 | 1.62324 | 6.37787572 | 1.705E-2 | DF 620364 |
| NF | 1 | | 1.63208 | | | |
| NC | 1 | | 1.61503 | | | |
| 6 | 1.62324 | 129.129543 | 1 | 1.59478431 | 0 | AIR |
| NF | 1.63208 | | 1 | | | |
| NC | 1.61503 | | 1 | | | |
| 7 | 1 | 168.847528 | 1.5206 | 8.58550863 | 8.59E-3 | HC 519604 |
| NF | 1 | | 1.52496 | | | |
| NC | 1 | | 1.51637 | | | |
| 8 | 1.5206 | −258.145257 | 1 | 193.5 | 0 | AIR |
| NF | 1.52496 | | 1 | | | |
| NC | 1.51637 | | 1 | | | |
| 9 | 1 | −54.741203 | 1.70332 | 2.999415 | 2.3246E-2 | EDF 699301 |
| NF | 1 | | 1.71546 | | | |
| NC | 1 | | 1.69221 | | | |
| 10 | 1.70332 | 54.741203 | 1.57043 | 13.2477177 | 9.016E-3 | DBC 569631 |
| NF | 1.71546 | | 1.57498 | | | |
| NC | 1.69221 | | 1.56597 | | | |
| 11 | 1.57043 | −30.9588275 | 1 | 0.662385886 | 0 | AIR |
| NF | 1.57498 | | 1 | | | |
| NC | 1.56597 | | 1 | | | |
| 12 | 1 | 44.6780051 | 1.51119 | 7.72541567 | 7.91E.3 | BSC 510644 |
| NF | 1 | | 1.51518 | | | |
| NC | 1 | | 1.50727 | | | |
| 13 | 1.51119 | −64.4225768 | 1 | 0.661478509 | 0 | AIR |
| NF | 1.51518 | | 1 | | | |
| NC | 1.50727 | | 1 | | | |
| 14 | 1 | 35.0746938 | 1.57043 | 13.2477177 | 9.016E-3 | DBC 569631 |
| NF | 1 | | 1.57498 | | | |
| NC | 1 | | 1.56597 | | | |
| 15 | 1.57043 | −26.9805337 | 1.70332 | 2.4995125 | 2.3246E-2 | EDF 699301 |
| NF | 1.57498 | | 1.71546 | | | |
| NC | 1.56597 | | 1.69221 | | | |
| 16 | 1.70332 | 87.5465713 | 1.57043 | 3.4993175 | 9 016E-3 | DBC 569631 |
| NF | 1.71546 | | 1.57498 | | | |
| NC | 1.69221 | | 1.56597 | | | |
| 17 | 1.57043 | ∞ | 1 | 0 | 0 | AIR |
| NF | 1.57498 | | 1 | | | |
| NC | 1.56597 | | 1 | | | |

SUR NUM = SURFACE NUMBER FROM LEFT TO RIGHT
R = RADIUS OF SURFACE
ND = REFRACTIVE INDEX FOR 0.555$\mu$ WAVE LENGTH TO LEFT OF SURFACE
ND = REFRACTIVE INDEX FOR 0.555$\mu$ WAVE LENGTH TO RIGHT OF SURFACE
T = THICKNESS/SPACE TO RIGHT OF SURFACE
NF = REFRACTIVE INDEX FOR SPECTRAL LINE F
NC = REFRACTIVE INDEX FOR SPECTRAL LINE C
dN = NF − NC ENTRANCE PUPIL AT FIRST SURFACE

The objective lens system 4 produces an image in an image plane P which is parabaloidal but, in the particular example illustrated, approximates to a spherical surface. In alternative designs the image plane could be plane or could be a distinct parabolic curve. An important feature of the design of the lens system 4 is that it defines principal rays, such as that shown at PR, which pass through the centre C of the entrance pupil (which in this case is the aperture stop defined by the casing 7) and appears to emerge from the virtual exit pupil CA. Each principal ray is normal to the image plane P.

An eye-piece 6 magnifies a portion P1 of the spherical image and presents it to a sensor 8 which, in this case, is a human eye. The gunner thus sees a portion of the field of view which contains a feature on which the gun is targeted. Other features, on which the gun is not currently targeted, can be viewed by adjusting the eye-piece. For this purpose the eye-piece has a flange 6A of part-spherical form which slides in a slot 7A of complimentary shape formed in part of a casing 7 of the gun sight. The arrangement of the flange 6A and slot 7A is such that, at all positions of the eye-piece 6 (e.g. the position indicated in broken lines), the optical axis of the eye-piece is aligned with a principal ray and is normal to the image plane P. Thus the eye-piece is at all times spaced by the same distance from the image plane P.

It is notable that the adjustment of the eye-piece can be affected without interference with the bore-sight of the gun. A graticule might be injected into the system in such a way as to match the spherical image. Alternatively a glass graticule might be used, which could be spherical or plane. Some facility for re-aligning the eye-piece with the axis of the objective might be needed. It would be possible to provide some form of detent mechanism for this purpose.

It will be appreciated that the system as illustrated is very much simplified for the purposes of description and that a practical system would include other features which are matters of routine design practice. For example, an erecting lens or prism system would be required to give an upright image and the system might also be periscopic. In extreme cases one might wish slightly to adjust the aperture stop to redefine the principal rays. In that case, the guiding mechanism for the eye-piece will be designed to take this into account and to ensure that the desired alignment of eye-piece-axis with principal rays is maintained.

I claim:

1. An optical device comprising image producing means for producing an image, receiving means for receiving a selected portion of the image, and an adjustment mechanism for adjusting the receiving means so as to select the portion of the image, wherein said image producing means has an aperture stop and defines principal rays passing through the centre of the aperture stop; and in which the receiving means is mounted so that, at any of its positions of adjustment, its optical axis is co-linear with either the optical axis of the image producing means or a said principal ray.

2. An optical device according to claim 1 in which the image producing means is designed so that each of its principal rays is normal to the image surface at the point where it intersects the latter.

3. An optical device according to claim 1 in which the receiving means is an eye-piece.

4. An optical device according to claim 1 in which the adjustment mechanism is such as to cause the receiving means to follow the shape of the image.

5. An optical device according to claim 2 in which the receiving means is an eye-piece.

6. An optical device according to claim 2 in which the adjustment mechanism is such as to cause the receiving means to follow the shape of the image.

7. An optical device according to claim 2, wherein said optical device is a gun sight.

8. An optical device according to claim 1, wherein said optical device is a gun sight.

* * * * *